July 24, 1951 — W. LOU — 2,561,441
CONTROL MEANS FOR DEHUMIDIFYING APPARATUS
Filed Feb. 4, 1949 — 4 Sheets-Sheet 1

Patented July 24, 1951

2,561,441

UNITED STATES PATENT OFFICE 2,561,441

CONTROL MEANS FOR DEHUMIDIFYING APPARATUS

Wyan Lou, New York, N. Y., assignor to Cargocaire Engineering Corporation, New York, N. Y., a corporation of Delaware Application February 4, 1949, Serial No. 75,781

14 Claims. (Cl. 183—4.7)

This invention relates to electronic control apparatus, and more particularly to such apparatus for governing a dehumidifying device.

Consider, for example, a dual bed type of dehumidifier. Each bed or adsorber of such a device contains a chemically inert drying agent, or desiccant, which has the ability to remove water vapor from the air which comes in contact with it. The process of so removing water vapor is known as "adsorption." When the bed becomes saturated with moisture it is necessary to remove the latter by a process known as "reactivation." Heat is applied directly or indirectly to the adsorber for this purpose, for example, hot air is directed through the saturated bed.

In a dual bed dehumidifier, hereinafter referred to as a D/H unit, of the type mentioned above, the desiccant beds or adsorbers are alternately on adsorption and reactivation. That is, while one is removing moisture from the air, the other is being reactivated or regenerated. The requirements for efficient operation of such a dual bed D/H unit are:

(1) One adsorber should be kept on adsorption until its maximum useful capacity has been reached under all conditions of dry-bulb temperature and relative humidity of the entering air, before it is changed to the reactivation cycle.

(2) The other adsorber should be maintained on the reactivation cycle until dried down to a nominal residual moisture content, and then be allowed to cool before switching to adsorption.

A D/H unit which is capable of removing one hundred pounds of water per hour from the air, the air being at 90° F. input temperature and 95% relative humidity, is, in normal design practice, said to be capable of operating under maximum moisture load conditions. A dual bed D/H unit in order to operate under these conditions must be provided with sufficient heater capacity to reactivate one of the desiccant beds within a period which is approximately equal to the time required for adsorption. Under less than maximum moisture load conditions, the adsorption period will length, as compared to that for maximum conditions, and the reactivation period will shorten. The present invention is designed to control a D/H unit which is adapted for operation under maximum moisture load conditions.

The ideal control for such a unit, as embodied in the present invention, is one which will stop reactivation on one bed when that phase is complete, as indicated in requirement (2) above, allow adsorption to continue on the other bed, and switch the cycles only when adsorption is completed as indicated in requirement (1) above.

Certain of the variables which can be used for giving a reliable indication of the states of the adsorber beds at any time during both adsorption and reactivation, in order to meet requirements (1) and (2) above, are, for example, dry-bulb temperature, dewpoint, and relative humidity.

In a practical electronic control of the type described herein, a device for sensing a variable, such as one of those above mentioned, must be dependable, and accurate within reasonable limits. Of the above variables, temperature can be readily measured and numerous sensing devices are available for the purpose, which devices are simple, inexpensive, of constant characteristics, rugged, and require little or no attention for maintenance.

The present invention employs temperature measurement to determine the states of the desiccant beds.

With respect to reactivation, usually air is employed as the reactivation medium and is heated to a constant temperature for the purpose, and pumped at substantial velocity through the moisture laden bed. The hot air carries away the moisture held by the desiccant. At first the wet air exhaust (effluent reactivation air) is relatively cool due to the large amount of heat given up in raising the temperature of the desiccant and its housing which is usually of metal. As water is driven out of the desiccant, the wet air exhaust temperature rises and remains fairly constant for a substantial part of the cycle. Towards the end of the cycle when all or most of the water has been removed, the effluent air temperature rises and approaches the input air temperature. A certain effluent temperature near the end of the cycle can be selected at which to terminate reactivation, because further application of heat will not result in much more benefit.

Regarding adsorption, input air is directed to an adsorber, for example, by a pump or fan, and the temperature of the input air normally remains constant or substantially so throughout a given adsorption cycle. The effluent air temperature is normally high at first due (a) to the high temperature of the adsorber housing and related structure, and the desiccant which has been recently reactivated; (b) to "heat of adsorption," that is, as the desiccant removes moisture from the air, heat is liberated. Heat of adsorption, of course, will manifest itself whether or not the adsorber is hot or cold at the beginning of the cycle. The amount of heat liberated depends on the rate of adsorption. With a substantially constant flow of air through the desiccant, the difference in temperature between the inlet and effluent air can be taken as a measure of the amount of moisture which has been adsorbed and also the rate of adsorption. The effluent air temperature will gradually diminish and approach the inlet air temperature. At a selected minimum temperature differential, ΔT, the adsorber is saturated up to its maximum useful capacity and can be switched over to reactivation.

However, the minimum differential for optimum performance of the D/H unit is not the same for all inlet air conditions. This differential varies with the inlet temperature.

Control devices of this general character suggested in the past have failed to take into account and to provide for variations in this minimum temperature differential.

Moreover, prior control apparatus of this nature have commonly switched the adsorption and reactivation cycles after a fixed time period metered as by a clock. Of course, a repeat period calculated to produce optimum performance for one set of conditions will not give such performance for other sets of conditions.

This invention in one aspect thereof comprises:

(1) Control means for stopping reactivation when the application of further heat will not result in any appreciable benefit. Thus a considerable energy saving can be effected. Such means, in the form shown, comprise an element for sensing the temperature of the reactivation wet air exhaust, and for shutting off the flow of heated air to the adsorber undergoing reactivation at a preselected temperature. The temperature sensing element, for example, is a resistance which is electrically associated with a thermionic valve device which is adapted for emitting a "stop-reactivation" signal of predetermined short duration whenever the preselected temperature is reached. This signal is directed to an "on-off" switching circuit in which is located a relay for governing a reactivation fan or pump. Energization of the "on-off" circuit by said signal, of course, will stop the reactivation fan.

(2) Control means for switching the cycles of the desiccant beds, for example, by switching a pair of air valves when the bed undergoing adsorption has reached its maximum useful capacity. Operatively associated with the cycle switching means are electronic means for restarting reactivation, for example, by restarting the fan to pump the reactivation hot air, in response to the switching of cycles, and if such reactivation means are already in operation at the time of the cycle switch-over, they must continue in operation. Under certain conditions, the means for generating a "stop reactivation" signal may be delayed in operation and such a signal generated thereby may be received by the reactivation means immediately after a switching of cycles which would destroy the proper sequence of events and present reactivation of a wet bed; electronic means are provided for preventing such a signal from stopping reactivation.

As above mentioned, temperature is herein employed for measuring the state of the adsorber undergoing adsorption. The temperature of inlet and effluent adsorption air are measured, and at a preselected differential therebetween the novel electronic control means bring about the cycle change-over and restart reactivation or permit the latter to continue if underway at the time of the change-over. Said inlet and effluent temperatures are sensed, for example, by resistance elements which preferably have negative temperature coefficients and the temperature-resistance characteristics of which are preselected whereby the resistances of the two elements are equal over a predetermined range of temperature differentials, the differential being a function of the inlet air temperature. A balance between the sensing resistance elements is determined, for example, by a bridge circuit and the state of balance is employed to trigger a normally quiescent oscillator or thermionic valve circuit for generating a "cycle change-over" signal of predetermined short duration. Such a circuit is constituted by an oscillator circuit which responds to a balance of said bridge. The "cycle changeover" signal is directed to a relay for governing the air valves of the D/H unit, the connection being through, for example, a trigger circuit which emits a signal which in turn actuates a circuit variously known as a sequence switching, a counter, or a "flip-flop" circuit, the relay being connected in the latter circuit and alternately energized and deenergized by succeeding signals from said oscillator circuit through the intermediary of the suitable trigger circuit. The trigger circuit is reset, that is, prepared to emit the next signal by a suitable reset circuit responsive to both the "cycle change-over" signal and the "stop reactivation" signal. The output signal of the trigger circuit is adapted for persisting at least as long as the cycle change-over signal and said circuit is interconnected with the reactivation side to restart reactivation if stopped, or to permit reactivation to continue if it is underway. The trigger circuit also provides, during the period of its signal, a shield to prevent an oncoming "stop-reactivation" signal from becoming effective. This shield is effective up to the end of a "stop-reactivation" signal providing the latter occurs during a cycle change-over signal.

One of the objects of the present invention is to overcome the defects above mentioned in connection with prior apparatus of this character.

The above and further objects and novel features will more fully appear from the detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views.

Figure 1:
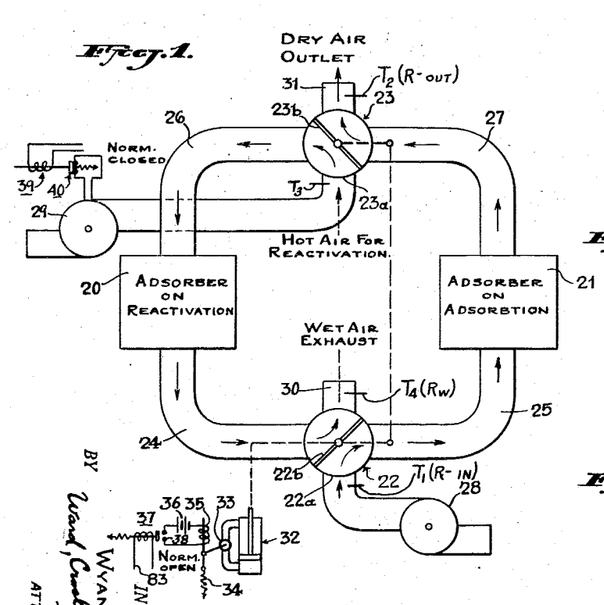
Fig. 1 is a schematic diagram of one form of dehumidifier unit with which the novel control device can be employed.

Referring to the drawings, a dehumidifier apparatus, which is adapted for being controlled by the novel invention herein disclosed, is illustrated in Fig. 1 and is constituted by a pair of adsorber beds 20 and 21 which are each filled with a desiccant such as silica gel. The adsorber beds 20, 21 are adapted for being alternately placed in adsorbing and reactivation cycles by a pair of so-called "four-way" air valves 22 and 23 which are respectively in communication with said beds by means of conduits 24, 25 and 26, 27 in a well known manner. Air intake for adsorption is directed to an inlet orifice 22a of the valve 22 by means of a suitable air pump or fan 28, and hot air for reactivation is directed to an inlet orifice 23a of the air valve 23 by means of a suitable hot air fan 29. Wet air exhaust is emitted from a conduit 30 which is in communication with the air valve 22 and a dry air outlet is provided at 31 which is in communication with the outlet orifice of the valve 23.

The valves 22 and 23 are, of course, provided with suitable movable valve elements such as plates 22b and 23b which are operatively interconnected preferably by mechanical means and adapted for being shifted angularly together. In the position shown of the valve plates 22b and 23b, the left hand adsorber is undergoing a reactivation cycle and the right hand adsorber 21 is undergoing an adsorption cycle. An angular change of 90° of said valve plates will cause a switching of the cycles.

The angular shifting of the valve plates can be effected, for example, by means of a pneumatic piston apparatus or element 32 having a control valve 33 which preferably is held against one limit of its motion by means of a suitable spring as at 34. The valve 33 can be shifted from one limit of its motion, as shown in Fig. 1, to the opposite limit, for example, by means of a solenoid 35 which is adapted for overcoming the spring 34. Thus energization of the solenoid 35 will shift the valve plates 22b and 23b from the position shown in Fig. 1 through an angular increment of 90°.

The solenoid 35 for governing the pneumatic piston device 32 can be in circuit with a suitable source of electric energy as at 36 and under the influence of a relay 37. The energization of the relay 37 is adapted for closing normally open switch 38, thereby completing the circuit of the solenoid 35. The operation of the relay 37 will appear more fully hereinafter.

The above-mentioned motor 29 which pumps heated air to the bed undergoing reactivation is under the influence of a relay 39 having normally closed contacts 40, which relay also acts in a manner to appear more fully hereinafter.

Figures 2, 3:
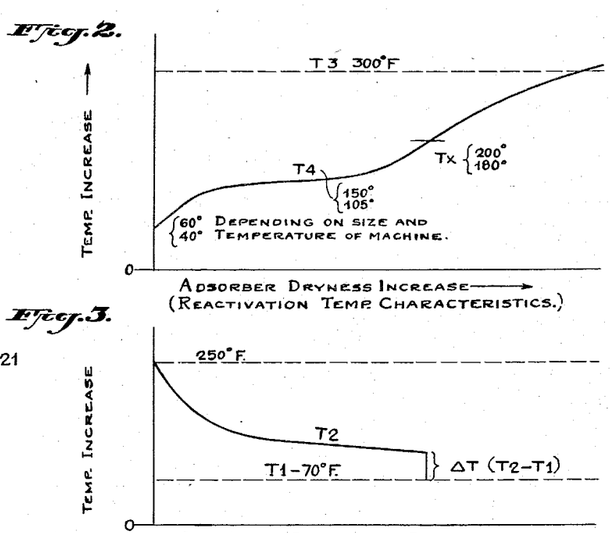
Fig. 2 is a graphical representation of reactivation temperature characteristics of the device of Fig. 1.
Fig. 3 is a graphical representation of adsorption temperature characteristics of the device of Fig. 1.

In Fig. 2, there is a graphical showing of the variation of wet air exhaust temperature during a period of reactivation on a typical D/H unit as that shown in Fig. 1. The air is heated to a constant temperature $T_3$, for example, 300° F. and is directed through the wet adsorber as at 20. The hot air carries away the moisture held by the desiccant. At first the air emerging from the machine through the conduit 30 is relatively cool due to the large amount of heat given up in raising the temperature of the desiccant and the housing structure of the adsorber. As water is removed from the desiccant, the wet air exhaust temperature rises and remains at a fairly constant level as indicated on the curve at $T_4$. Towards the end of the reactivation cycle when all or most of the water has been removed, the temperature rises and approaches $T_3$. At a certain temperature, for example, $T_x$, the reactivation should be cut off because beyond this point any further application of heat will not result in much more benefit.

In Fig. 3 there is a graphical representation of the variation of temperature on the adsorption side of the apparatus. For example, $T_1$ represents the temperature of the inlet air which normally remains constant or substantially constant throughout a given cycle of adsorption. $T_2$ represents the temperature of the dry air issuing from the adsorber, that is, effluent temperature.

$T_2$ is initially relatively high due to: (1) The high temperature of the adsorber structure as the housing mechanism and also due to the fact that the desiccant bed has previously been reactivated with hot air. This, of course, is an inherent characteristic of this type of machine. (2) As the desiccant removes moisture from the air, heat is liberated. This is called "heat of adsorption" as above mentioned. Thus heat is given up to the dry air raising its temperature as it emerges from the adsorber. The amount of heat liberated, as has also been mentioned above, depends upon the rate of adsorption. Consequently, if a relatively constant flow of air is directed through the desiccant, the difference in temperature between the inlet and the outlet air can be an indication of the rate of adsorption and the amount of adsorption. $T_2$ gradually diminishes as the adsorber bed becomes more saturated and at some minimum temperature differential the adsorber is saturated up to its maximum useful capacity and should be switched over to the reactivation cycle.

Figure 4:
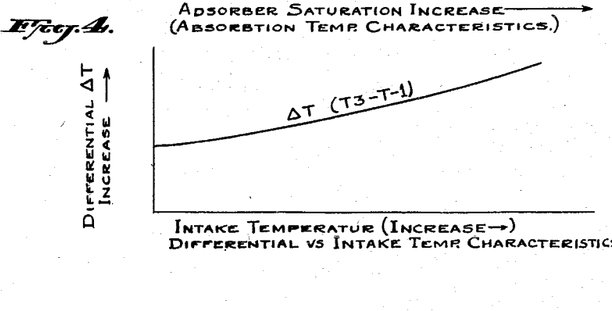
Fig. 4 is a graphical showing of variation in a critical temperature differential which is measured by the present invention.

It is important to note that the minimum temperature differential for optimum performance of the D/H unit is not the same for all inlet air conditions. This minimum temperature differential varies with the inlet air temperature in the manner shown in Fig. 4. The novel control apparatus described herein takes into account this variation in minimum temperature differential in a manner to appear more fully hereinafter. For example, with one type of D/H unit, it has been found that the minimum temperature differential at which the adsorption cycle should be terminated is 16° when the inlet temperature $T_1$ is 0° F. When the inlet temperature rises, for example, to 113° F., the optimum minimum temperature differential has been found to be 50° F.

The novel apparatus described herein fulfills the following requirements in so far as the sequence of operation is concerned: (a) Reactivation is stopped when it is completed to an economical point as above mentioned. (b) The air valves on the D/H unit are switched when the desiccant undergoing adsorption has been saturated to its economical limit also as above mentioned. (c) When the valves are switched, the reactivation mechanism must be restarted if it has been stopped or it must be permitted to continue in operation if it is under way. (d) If, due to a time lag, in response to the reactivation control device, the reactivation exhaust temperature sensing element should call for a stopping of reactivation immediately following the switching of the valve, then reactivation must not cease and means are provided for preventing the "stop reactivation" signal from becoming effective.

I have found that the pair of temperature sensitive resistance elements which preferably are properly compensated as by shunt resistances, and connected into a bridge circuit with two standard resistors, can be successfully employed to measure the above-mentioned temperature differential which can vary from cycle to cycle, depending upon the inlet air temperature. Two such resistance elements or resistors 41, 42 are indicated in Figs. 7, 7a, 7b and 8 and are preferably compensated by shunt resistors 43 and 44 respectively to provide the desired temperature-resistance characteristics as in Fig. 6 The temperature sensitive resistors 41, 42 with their respective shunt resistors are respectively referred to as R-in and R-out. It is not absolutely necessary to compensate 41 and 42 as above but it has been found desirable in order to assist in producing said desired characteristics.

Figures 6, 7, 7A, 7B:
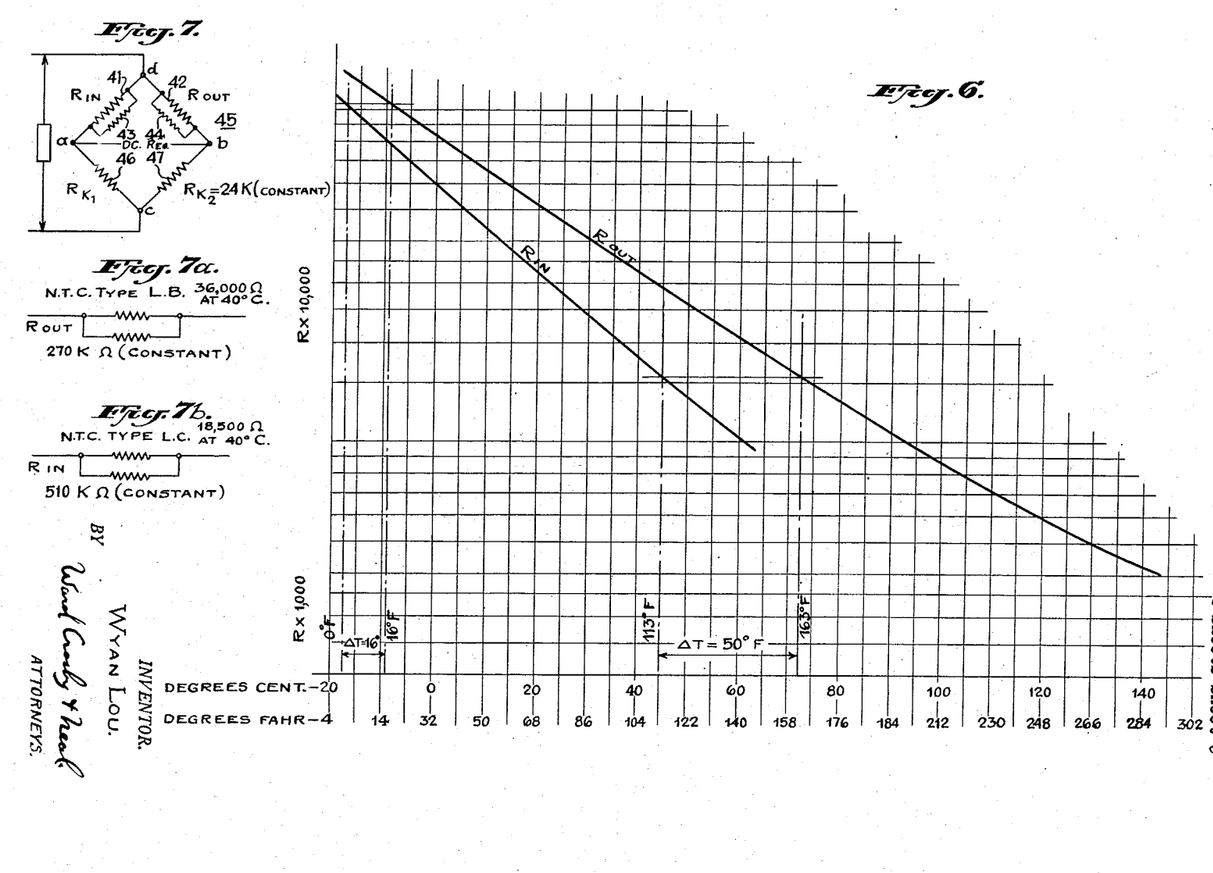
Fig. 6 is a graphical illustration of changes in resistance with change in temperature of temperature sensing resistance elements employed in the present invention.
Fig. 7 is a schematic showing of a bridge circuit in which said temperature sensing resistance elements can be employed.
Figs. 7a and 7b indicate specific forms of said temperature sensing elements having compensating resistances associated therewith.

In Fig. 7 the resistors are shown in a balancing bridge 45 with two of the balancing arms constituted by R-in and R-out, and the two fixed ratio arms constituted by fixed resistors 46, 47, the latter two are also referred to as $R_{k1}$ and $R_{k2}$. The two conjugate arms of the bridge are indicated as at $ab$ and $cd$. A regulated constant direct current potential, as 105 volts is applied across arm $ab$.

The graph indicated in Fig. 6 shows how the temperature sensing resistors can be employed for measuring a varying temperature differential. R-in and R-out are, in the form shown, so compensated that they provide substantially straight line resistance characteristics as in Fig. 6, and they are so chosen that their substantially straight characteristic lines diverge in such a manner that, for equal resistances, that is when the resistances are in balance, a temperature differential exists therebetween which for a given R-in is constant but which can vary in response to a change in R-in or in the resistance at which bridge balance occurs. Thus the temperature sensing resistors are so chosen that only when there exists certain desired differences in temperature between them, their resistances will become equal, and these differences will depend upon the temperature of R-in. A bridge null detector is devised to utilize bridge balance as a control factor.

I have found it desirable to employ thermal resistance elements R-in and R-out which have negative temperature coefficients. Such resistors, at the present time, are made from a class of materials known as semi-conductors, that is, materials whose conductivity lies between that of conductors and insulators. These resistors are normally known as thermistors. Thermistor materials are usually comprised of various combinations of manganese, nickel, cobalt, copper and other metallic oxides and the resistance thereof increases rapidly as the temperature falls and vice versa, the resistance decreases as the temperature rises.

Positive temperature coefficient resistors, of course, can be employed but the negative temperature coefficient resistors are preferable because of an unusually large numerical coefficient. Thus the negative temperature coefficient materials have temperature-resistance curves which are of greater slope than similar curves for substances having positive temperature coefficients. Thus if substances having a positive temperature coefficient are used, the slope of their temperature resistance curves may be lower and consequently require much higher sensitivity in the measuring device. This may lead to considerable error in the event that the measuring devices are not in fact extraordinarily sensitive. The use of thermistors or negative temperature coefficient substances permits the use of electronic measuring circuits which need not have extraordinary sensitivity.

Thus the characteristics of the negative temperature coefficient resistors are ideal for temperature sensing elements to be employed in the present invention. Such thermistors are small, light and inexpensive. Moreover, no moving parts are involved and consequently little or no maintenance is required. The wide operating range of the thermistors more than covers the temperatures which normally are encountered in D/H units.

It was mentioned above that a bridge null detector is employed to utilize the bridge balance as a control factor. I have found that it is advantageous to employ bridge balance as a control factor because of the great difficulty of measuring the very slowly varying D. C. potential which occurs in the bridge shown as in Fig. 7. The variation of this D. C. potential may be only a small fraction of a volt over a period of several minutes and an electronic circuit to be sufficiently sensitive to respond to such a change would have to be extraordinarily sensitive and expensive. Moreover, it would be subject to power line voltage fluctuations; and changing tube characteristics; variation of characteristics of the tubes with tube replacements, and many other factors such as circuit complications and so forth. Thus the actual measurement of such a direct current or of a D. C. potential is not considered desirable. However, if necessary, such measurement can be made and still be within the purview of the present invention. The embodiment described herein employs the point of bridge balance as the control factor, which initiates a "cycle change-over" impulse with one bridge, and also a "stop reactivation" impulse by means of another bridge.

Thus, in the form shown of the present invention, two bridges are employed, one for sensing the differential between inlet and effluent air for the adsorption side of the device, and another for sensing the reactivation exhaust temperature. The two bridges are preferably supplied with a regulated direct current voltage from a common source and to prevent inter-reaction are decoupled in a manner to appear below.

*Adsorption side bridge balance signalling means*

The bridge balance signalling means are also referred to as a bridge null detector and a bridge null detector oscillator. Said device includes an oscillating circuit which normally is quiescent when the bridge is out of balance. However, as soon as the bridge comes into balance an alternating signal voltage of large magnitude appears at the output of the oscillator. The bridge balance signalling means are novel in that they are normally quiescent and are not actuated until bridge balance exists. I have found that a multi-vibrator type circuit under the influence of a trigger tube such as a diode produces a bridge balance signal of desired characteristics. The signal voltage from the multi-vibrator in combination with such a diode is a uniform one and maintains itself without fluctuation after the bridge passes through its balance point and becomes unbalanced. When the bridge passes back into its original unbalanced state, the output signal of said oscillator does not instantly stop but is maintained steadily until a predetermined degree of bridge unbalance is reached at which time it abruptly stops. The circuit is such that the output signal is "anti-hunting" and there is a predeterminable time difference between the commencing and the terminating of the signal. This is accomplished electronically and without the use of any other external signal or initiating impulses.

In conjunction with the bridge balance signalling device above mentioned, there are employed, in the form of the invention shown, certain thyratron tubes which are adapted for controlling the above-described valve control relay 37. These thyratron tubes are designed for operation on direct current with alternating current upon the grids thereof. Consequently it is desirable for the bridge balance signalling means to produce an alternating current signal of a predeterminable duration. The circuits and operation of said thyratrons will be more fully explained hereinafter. It is, of course, possible to operate said thyratrons with alternating current across the cathodes and anodes. Alternating or direct current may be used on any and all electrodes of such thyratron tubes. However, this invention is especially adapted for use aboard vessels such as merchant ships wherein, for example, 230 volt direct current is usually available.

Consequently, it is desirable for the bridge balance signalling means to be able to produce an alternating current in response to a direct current signal for the purpose of controlling the thyratron circuit above mentioned.

Figures 8, 8A:
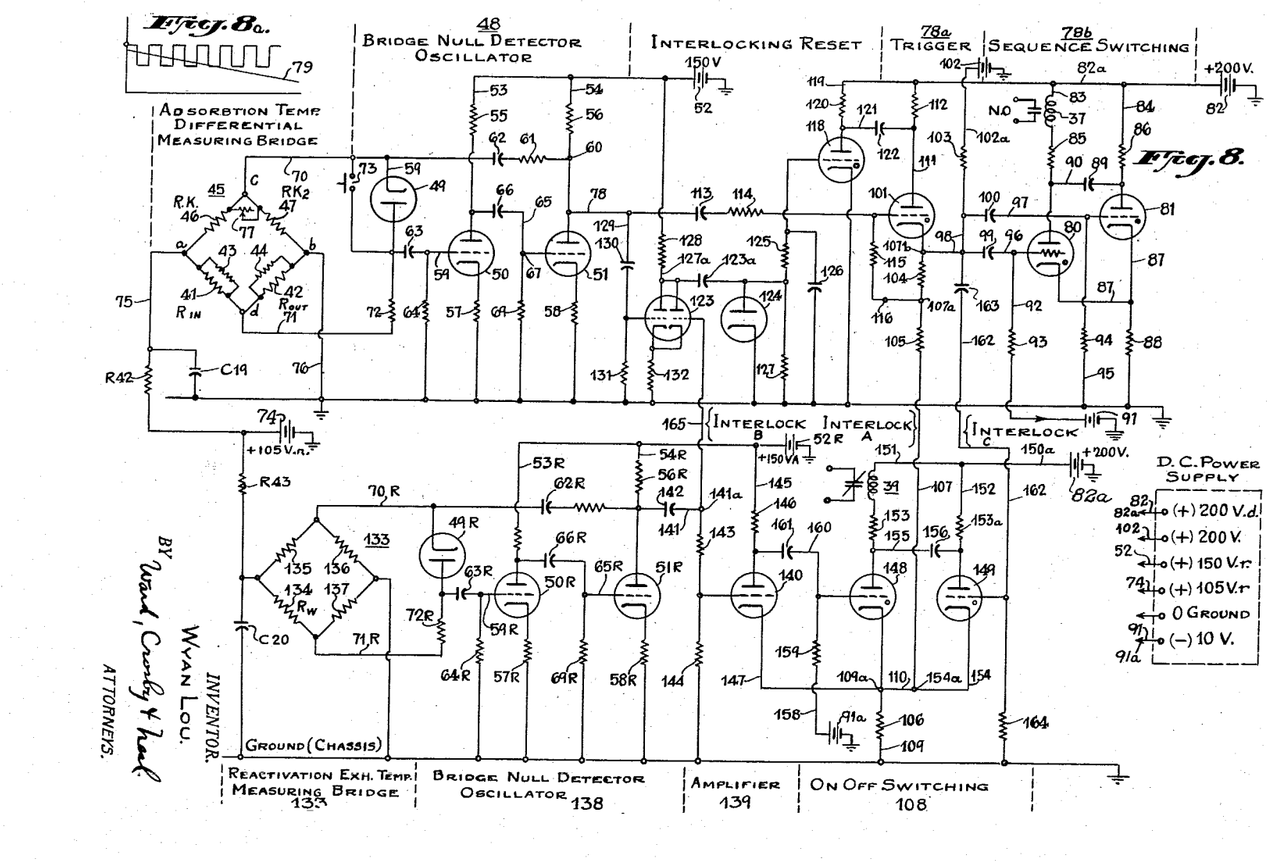
Fig. 8 is a wiring diagram showing detailed schematic representation of one embodiment of the invention.
Fig. 8a is a graphical representation of voltages occurring in one of the circuits embodied in the present invention.

Said bridge balance signalling device is indicated as at 48 and includes a diode 49 and triodes 50 and 51. The triodes 50 and 51 are interconnected as a multivibrator. That is, the plate of each triode is connected to the grid of the other triode. One of such connections between the plate and grid contains in shunt the rectifier 49 and a conjugate arm of the balancing bridge 45.

The plates of tubes 50, 51 are connected to a regulated source of direct current 52 of, for example, 150 volts, by means of leads 53, 54, respectively. Suitable plate resistors 55, 56 are interposed respectively in said leads.

The cathodes of tube 50, 51 are respectively connected to ground through cathode plate current biasing resistors 57, 58.

The plate of tube 51 is connected to the grid of tube 50 via a lead 59 connected at point 60 to plate lead 54. Interposed in lead 59 are: (a) resistance 61; (b) condenser 62; (c) diode 49; and (d) condenser 63. A grid resistor 64 for tube 50 is connected to lead 59 intermediate condenser 63 and said grid.

The plate of tube 50 is connected to the grid of tube 51 by a lead 65 having therein a condenser 66, and having at point 67 a grounded lead 68 connected thereto in which is interposed a grid resistor 69.

Connected in shunt with the diode 49 is a conjugate arm $cd$ of bridge 45 by means of leads 70, 71, the latter having interposed therein a load resistor 72 for the tube 49.

The feedback path of the multi-vibrator circuit above set forth is from the plate of tube 51 via resistance 61, condenser 62, diode 49 and condenser 63. Diode or rectifier 49 acts as an "on-off" switch completing or breaking the feedback circuit in response to the balance of bridge 45. The "on-off" tube 49 can be by-passed via a normally open manually operable push-button switch 73 as shown. Pushing of this button completes the feedback path around diode 49 and causes the circuit to oscillate regardless of bridge balance, and for the duration of the closing of switch 73. Diode 49 is connected in feedback relation with said multi-vibrator. For example, the anode thereof is coupled to the control grid of one of said tubes and its cathode is coupled to the plate of the other tube. Diode 49 thus constitutes a normally quiescent thermionic valve electrically connected to and controlling the oscillator comprising the multi-vibrator.

Bridge 45 is powered by a source 74 of regulated direct current of, for example, 105 volts via leads 75, 76.

If we assume now that the bridge 45 is out of balance with the resistance of R-out less than R-in, that is the temperature $T_2$ is higher than $T_1$, with $RK_1$ (46) and $RK_2$ (47) remaining constant and equal, point $d$ of the bridge 45 will be at a lower potential than point $c$. Thus the plate of the rectifier or diode 49 will be negative with respect to the cathode thereof. Tube 49 consequently will not pass current because the feedback path of the circuit of oscillator 48 is open and thus no oscillation can occur. Then gradually as the temperature $T_2$ drops, the resistance of R-out slowly increases until it becomes equal to R-in. At this instant the bridge is in balance and points $c$ and $d$ are at the same potential. The diode 49 will then conduct. Electron flow will be amplified by tubes 50 and 51 and will be fed back in phase through the diode 49 to reinforce the original voltage. The feedback path is as above set forth. Only negative pulses or voltages can pass through the rectifier 49 but this is sufficient for operation of the circuit. The feedback voltage will appear across the load resistor 72, and in view of its pulsating nature will also appear across the grid resistor 64. Oscillation will build up and a pulsating output signal voltage of large amplitude will appear across the plate resistor 56 of the tube 51.

A so-called contact potential effect may exist with respect to the diode 49 which may make the plate thereof slightly negative when it is not conducting. This can be compensated for by means of a variable resistance as at 77 between the fixed resistances 46 and 47 of the bridge 45. The so-called "contact potential" effect of the diode 49 may cause premature triggering of the diode shortly before the bridge is in balance. Thus it may be desirable carefully to adjust the variable resistance 77.

Said pulsating signal voltage of large amplitude which appears across the plate resistor 56 constitutes the bridge balance signal and is directed by means of a lead 78 to the relay 37 (Fig. 1) for controlling the position of the valve plates 22b and 23b through the intermediary of a trigger circuit 78a and a so-called sequence switching circuit 78b to appear more fully hereinafter. The bridge balance signal is also referred to as the "cycle changeover" signal.

Said relay 37 is connected into said sequence switching circuit, which is adapted for energizing the relay in one condition of said circuit and de-energizing same in another condition. The sequence switching circuit is consecutively changed from said first condition to said second condition by consecutive cycle change-over signals from the oscillator 48. Thus when the relay 37 is energized it remains in this state following a given cycle change-over signal, until the next cycle change-over signal at which time the relay is deenergized. Thus the control valve 33 (Fig. 1) is held in one position by the spring 34 when the relay 37 is deenergized and when the latter is energized the spring 34 is overcome and the solenoid 35 is adapted for urging same to the opposite limit of its motion. Said trigger circuit, which governs said sequence switching circuit, is reset, that is, it is prepared to emit the next succeeding signal by means of a suitable reset circuit which is responsive, for a reason to appear hereinafter, both to the "cycle change-over" signal and the "stop reactivation" signal.

It was mentioned hereinbefore that the cycle change-over signal is of predetermined duration. It is necessary for this signal to persist only for a relatively short period in order to initiate the operation of the trigger circuit and the sequence switching circuit. The trigger circuit in addition to initiating a "cycle change-over" signal also can initiate a "start reactivation" signal as will appear below. Immediately after the initiation of such an impulse for starting the reactivation, a "stop reactivation" signal may occur and may thus arrest the reactivation and prevent the rejuvenation of a wet desiccant bed. This, of course, must be prevented.

It was mentioned above that the trigger circuit, during the period of the cycle change-over signal, in addition to its normal function provides a shield to prevent an oncoming stop-reactivation signal from becoming effective. In the form of the invention shown, this so-called shield is effective for the duration of a "stop-reactivation" signal providing the latter occurs during a cycle change-over signal. Thus it is desirable for the cycle change-over signal to be of adequate duration somewhat longer than any anticipated period of delay in generating the "stop-reactivation" signal. I have found that in machines of this type a delay of one or two seconds is as long as will be normally encountered in generating such a stop-reactivation signal. Consequently it is desirable for the above-mentioned stop-reactivation shield to be effective for a period somewhat longer than said one or two seconds. Consequently, the duration of the cycle change-over signal preferably should be from about 3 to 5 seconds. Thus by the time the cycle change-over signal has expired, any delays in the generation of the stop reactivation cycle will have taken place and during the time that said shield is effective.

The above-described multi-vibrator circuit is especially well adapted for producing a bridge balance signal (cycle change-over signal) of the above duration, and of non-hunting characteristics.

The non-hunt or anti-hunt property of said signal can be explained by the following characteristic of the multi-vibrator circuit acting in combination with (a) the dehumidifier, (b) the bridge 45, and (c) the diode 49: when the bridge 45 has come into balance, immediately the valves 22b and 23b are shifted and a blast of hot air strikes the resistor R-out, causing its resistance to decrease and thus brings the bridge back to its original unbalanced state. As the bridge passes out of the so-called null point or balanced condition, the oscillation of the multi-vibrator circuit does not instantly stop, that is, the cycle change-over signal persists for said period of, for example, 3 to 5 seconds. The reason for this is that although the plate of the diode 49 may be negative with respect to the cathode, the negative peaks of the feedback voltage, as indicated in Fig. 8a, and aided by the so-called "initial velocity" of the electrons leaving the cathode, are able to pass from the cathode to the anode to maintain oscillation for a predeterminable period during bridge unbalance and immediately after said valves are shifted. When said blast of hot air strikes R-out, the point $d$ of the bridge 45 is lowered in potential with respect to point $c$. The lowering of this potential is gradual and is indicated by the slope of the line 79 (Fig. 8a) indicating the change in potential of said point $d$. Superimposed upon the representation of this changing potential is the oscillating feedback potential of the multi-vibrator. This oscillating potential for a short while persists and extends below the curve of the gradually diminishing potential of the point $d$ (which also is the potential of the plate of diode 49). The peaks thus are capable of extending below this curve for a time which is a function of (1) the slope of the line 79, and (2) the amplitude of the feedback potential. The latter amplitude is fixed and is a function of the resistance 61. The slope of the line 79 in turn depends upon the resistance change rate of R-out.

If said rate is great, the slope of the line 79 (Fig. 8a) will be large and consequently the time between "on" and "off" of the diode 49 will be quite short and conversely. As above mentioned, it is desirable, however, to select a resistance which, when the air valves are switched, will undergo a change adequate to produce such a slope that the time between "on" and "off" will be between about 3 to 5 seconds.

After, for example, said 5 seconds, depending upon the amplitude of the feedback potential, during bridge unbalance, and upon the resistance 61, the negative peaks (Fig. 8a) can no longer pass the line 79, that is, the electron flow resulting from the feedback potential is unable to pass from the cathode to the anode. At this point oscillation will stop abruptly and the plate is so much more negative than the cathode that once the oscillation has stopped, any feeble feedback surges appearing at the cathode will be effectively blocked. Thus the circuit is provided with the so-called anti-hunt characteristic.

In the multi-vibrator circuit, the frequency and amplitude of the oscillation are governed by suitable circuit constants and the frequency and wave form are not of particular importance. Neither is the signal amplitude so long as it is sufficiently high to trigger a circuit to be described hereinafter. The cycle change-over signal generated by the multi-vibrator is of a voltage which is many times greater than that required, in order to avoid the disadvantageous effects such as those due to the aging of the tubes and the variation of tube characteristics which may occur when a tube is replaced.

*Sequence switching circuit or counter circuit*

As above mentioned, the relay 37, which is normally open, is connected into a sequence switching or counter circuit 78b in such a manner that it is alternately energized and deenergized by succeeding signals from said multi-vibrator circuit through the intermediary of a suitable trigger circuit 78a. Such sequence switching circuit will be first described and thereafter its actuating trigger circuit.

In the form shown, the sequence switching circuit comprises suitable thyratrons 80 and 81 which are connected in the manner of a so-called "flip-flop" circuit. The thyratrons 80 and 81 are connected to a plate supply voltage preferably of plus 200 volts as at 82 by means of leads 83 and 84, respectively, which in turn are connected to a master plate supply lead 82a. Interposed in the leads 83, 84 are the plate resistors 85 and 86. The cathodes of the thyratrons 80 and 81 are connected to ground by means of a lead 87, there being a suitable cathode bias resistor 88 interposed therein.

Suitable means not shown are employed for delaying the application or impression of the plate voltage of battery 82 by, for example, 30 seconds after the starting of the control apparatus.

A so-called commutating condenser as at 89 is connected across the plates of the two tubes 80 and 81 by means of a lead 90 which interconnects the plate supply leads 83, 84 at points intermediate the respective plates of said thyratrons and their respective plate resistors 85, 86.

The above-described relay 37 is connected in the lead 83. Thus whenever the thyratron 80 is conducting, a current will flow in the relay coil of relay 37 to energize same and conversely when the thyratron 80 is non-conducting, said relay will be deenergized.

The condenser 89 is referred to as a commutating condenser or capacitor because it acts to shift the actuation or conduction of the thyratrons 80 and 81 alternately by changing the potential of their respective plates in a well known manner in response to an initiating impulse to be described more fully hereinafter.

It is necessary in the operation of such a counter or flip-flop circuit for one of these thyratrons to be initially non-conducting and the other one initially conducting. In order to accomplish this, the grid, for example, of thyratron 80, has applied thereto a direct current potential of, for example, minus 10 volts which will suppress the operation thereof until the occurrence of an initiating impulse from the above-mentioned trigger circuit. Such a direct current potential is provided as by a battery 91 which is connected to the grid of thyratron 80 by means of a lead 92, there being a suitable grid bias resistance 93 connected therein. A grid bias resistance 94 is connected to the grid of tube 81 by a grounded lead 95.

The grids of the thyratrons 80 and 81, by means of leads 96 and 97, respectively, are connected to a common lead 98 through which the sequence switching initiating impulse is received from the trigger circuit above mentioned. Interposed in the leads 96 and 97 are capacitors 99 and 100, respectively.

When an impulse with a steep wave front, and of very short duration, is generated by said trigger circuit and applied to the grids of the thyratrons 80, 81 through said condensers 99 and 100, the initially non-conducting thyratron 80 will instantly conduct, thus: (a) energizing the relay coil 37, (b) closing the relay contacts 38, (c) energizing solenoid 35 and moving valve 33 against spring 34 to one limit of its motion. Thyratron 81 (initially conducting) is simultaneously extinguished through the commutating capacitator 89. The next trigger impulse, whenever it appears, will switch the operation of the tubes 80 and 81 and thus will fire the tube 81 causing it to extinguish the thyratron 80 via condenser 89 and consequently (a) to deenergize the relay 37, (b) open the contacts 38, and (c) permit spring 34 to return valve 33 to its original position. Thus energization and deenergization of said relay will cause a switching of the dehumidifier valves 22b and 23b.

From the above, it is seen that whenever the multi-vibrator or bridge balance signalling means generates a signal, no matter of what duration, only a single but separate initiating impulse need be directed to the sequence switching or counter circuit. Such latter impulse must be of very short duration, lasting less than the de-ionization time of the thyratrons.

*Trigger circuit*

The trigger circuit employs a thyratron trigger tube as at 101. This tube is adapted for generating the above-mentioned steep wave front impulse which is capable of actuating the sequence switching circuit.

The trigger tube 101 normally is non-conducting by virtue of a bleeder current which exists because of the connection of a direct current source 102 to the cathode of said trigger tube via a lead 102a and lead 98. The direct current source 102 provides, for example, plus 200 volts and its current flows through a resistance 103 in said lead 102a, and also through resistances 104, 105 and 106 and thence to ground. The resistances 104 and 105 are interposed in a lead 107 which is connected to the cathode of the trigger tube 101 at point 107b and also connected with an "on-off" switching circuit 108 for a purpose to be described more fully hereinafter. Said resistance 106 is in a lead 109 which, by means of a lead 110 is connected to said lead 107.

The lead 107 is also referred to as interlock A and its function will be more fully explained below.

The potential of the energy source 102 (plus 200 volts) is necessary to create a bias upon the grid of the trigger tube 101 and causes same to be normally non-conducting.

The plate of the trigger tube 101 is connected in a conventional manner by means of a lead 111 to said plate supply lead 82a and has interposed therein a plate resistor 112.

The output lead 78 from the multi-vibrator 48 is electrically connected to the grid of the trigger tube 101, there being a suitable condenser 113 therein, together with a resistance 114. The condenser 113, of course, prevents the passage of direct current to the trigger tube 101 and the resistance 114 governs the amplitude of the signal to the grid of said trigger tube.

The grid resistor 115 for the trigger tube 101 is connected by a lead 116 to a point 107a of the lead 107 intermediate the resistances 104 and 105.

A point 107b is maintained at a predetermined potential above ground due to said bleeder current. When a bridge balance signal is put out by the multi-vibrator 48, the trigger tube 101 is instantly fired and the instantaneous flow of current from this tube through said resistances 104, 105 and 106 causes the potential of the point 107b suddenly to jump upwardly and thereby to produce the steep wave front impulse above mentioned.

Figure 5:
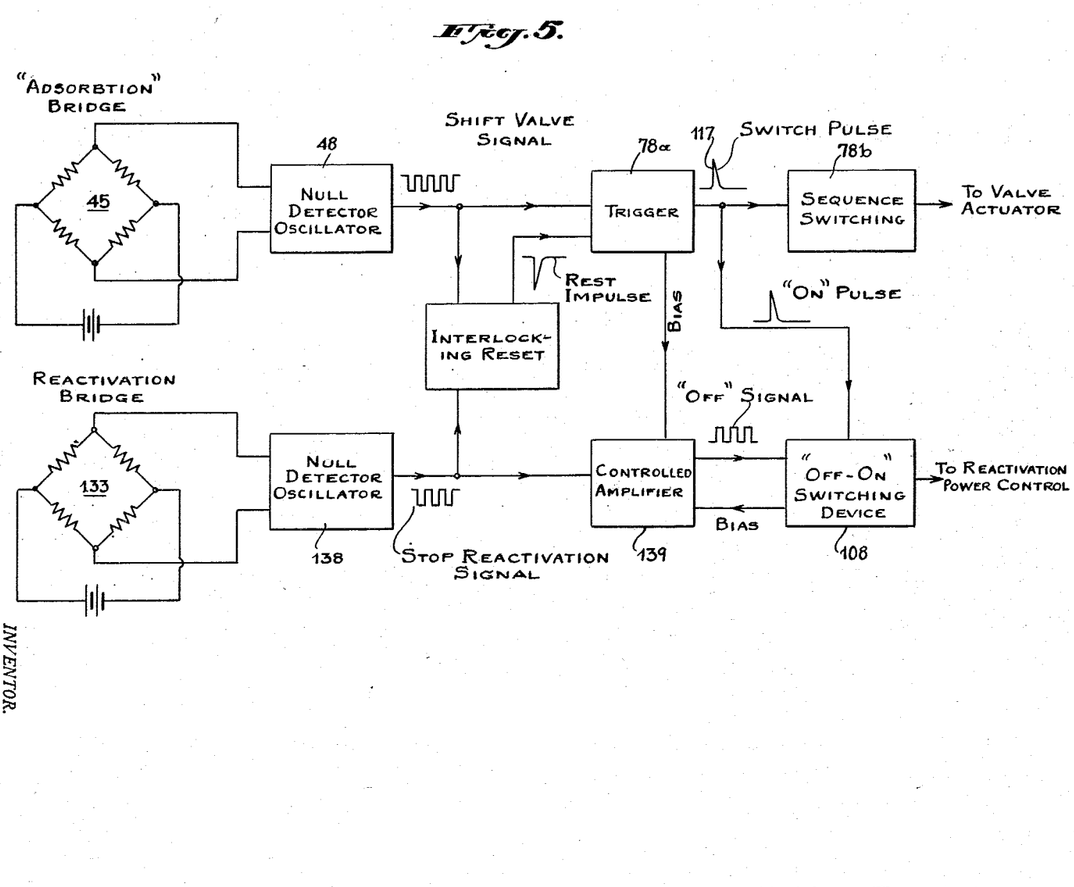
Fig. 5 is a so-called block diagram illustrating schematically the electrical interconnections of certain elements of one form of the present invention.

This impulse is transmitted to the sequence switching thyratrons 80 and 81 through the condensers 99 and 100, respectively, and the sudden voltage jump causes one of said tubes 80, 81 to fire if it is non-conducting, and has no effect at all upon the other one. However, the firing of the non-conducting tube, for example, 80, will, through the intermediary of said commutating condenser 89, cause the conducting tube, for example, 81, to be extinguished. The condensers 98 and 89 instantly start to discharge after said voltage jump producing a pulse form as shown, for example, at 117 in Fig. 5.

Interlocking reset circuit

This circuit is termed a reset circuit because once the trigger tube 101 has fired, such circuit provides means for returning the tube to its initial non-conducting state whereby it is reset and prepared for re-firing upon the occurrence of the next successive bridge balance signal from the multi-vibrator 48. It is termed an interlocking reset circuit because it is interlocked in a manner to appear more fully hereinafter with the reactivation side of the apparatus in order to insure that a "stop reactivation signal" will be ineffective should it occur during a cycle changeover signal or persist after the expiration of the latter signal.

Once the trigger tube 101 has been fired, it will remain conducting until it is extinguished. This extinguishment demands a negative impulse, from a suitable source such as reset tube 118, to be applied to the anode or plate of the trigger tube 101. The plate of the reset tube 118 by means of a lead 119, having a suitable plate resistor 120 therein, is also connected to said plate supply lead 82a. On the plate side of said plate resistors 112, 120 a lead 121 interconnects the plate leads 111 and 119 of tubes 101 and 118, respectively. A commutating condenser 122 is interposed in the lead 121. Thus the above-mentioned negative impulse for arresting the operation of trigger tube 101 is communicated thereto through the commutating condenser 122 in a manner somewhat similar to that explained in connection with the above-described commutating condenser 89.

The reset tube 118 normally is without bias and in a conducting condition. However, when the trigger tube 101 is fired by a signal from the multi-vibrator the reset tube 118 is extinguished. When the latter tube is extinguished, suitable means must be provided for preventing it from again conducting, not only until the bridge balance signal from the multi-vibrator 48 has ceased but, for reasons to be elaborated upon below, also until the bridge balance signal from the reactivation side of the apparatus has ceased provided such signal is at least partially co-extensive or overlapping with the signal from multi-vibrator 48. The tubes 101 and 118, of course, never must be conducting at the same time, otherwise there would be no means for resetting the trigger tube 101.

In order to prevent the reset tube 118 from refiring after it has been extinguished by the trigger tube 101, the grid of the reset tube must gain control instantly after it is extinguished and before the gas therein can again ionize. This is accomplished by providing a negative bias voltage to the grid of said reset tube in the following manner: the first signal pulse or bridge balance signal of the multi-vibrator 48 which fires the trigger tube 101 is also applied to one of the grids of a dual triode amplifier tube 123. The output of the latter tube is rectified by a diode 124 and a pulsating negative voltage appears at the plate of the latter. This pulsating voltage is smoothed and applied to the grid of the reset tube 118 through a resistance capacitance filter 125, 126. Thus the reset tube 118 has a negative bias applied thereto and will not conduct until the bridge balance output signal ceases, that is, until the multi-vibrator signal stops. This period is, for example, from 3 to 5 seconds. When the multi-vibrator signal disappears, the bias voltage will leak off through a suitable resistance 127 connected to the plate of tube 124 and the bias voltage will disappear whereupon the reset tube will again instantly conduct and extinguish the trigger tube 101.

Thus whenever a bridge balance signal is transmitted from the multi-vibrator 48, it not only fires the trigger tube 101 but sets in motion means for extinguishing said trigger tube. When the bridge balance signal from the multivibrator 48 ceases, the trigger tube 101 is reset and is prepared, when it receives the next succeeding bridge balance signal, to generate another impulse for the sequence switching thyratrons 80, 81, except when an overlapping stop reactivation signal occurs as will appear below.

The plates of the tubes 123, 124 above mentioned are connected by means of a lead 127a, through a plate resistor 128, to said plate supply 52 preferably of 150 volts (regulated). Also the first grid of the dual triode 123 is connected to the output lead 78 of the multi-vibrator 48 by means of a lead 129 having interposed therein a suitable condenser 130. Suitable grid and cathode bias resistors 131 and 132, respectively, are provided for said triode 123, and a condenser 123a, of course, is interposed between the plates of the triode 123 and rectifier 124. The cathode of tube 124 is connected directly to ground.

The dual triode 123, of course, is connected as a mixer amplifier with a common plate resistor, element 128, and with two separate inputs, each isolated from the other. Thus this dual triode can receive two separate input signals.

Reactivation side bridge balance signaling means

On the reactivation side of the apparatus a reactivation exhaust temperature measuring bridge is employed which in general is similar to the adsorption temperature differential measuring bridge 45. Such a bridge is shown as at 133 and differs from the bridge 45 in that only one thermistor 134 (RW) is used in the bridge as one of the balancing arms. The remaining three arms 135, 136 and 137 are fixed resistances.

A reactivation bridge null detector oscillator, also referred to as a bridge balance signalling means, is provided as at 138 which is identical to the multi-vibrator 48 above described, except that the manually operable push button as at 73 on the adsorption side of the apparatus is not provided on the reactivation side. The reason for this is that the button 73, in a manner to appear later, is adapted for initiating not only a cycle change-over signal but also for starting reactivation. Consequently, it is unnecessary to have such a button or switch on this reactivation side of the control.

Elements of the reactivation multi-vibrator 138 which correspond to elements of the adsorption multi-vibrator 48 are designated by corresponding numbers having added thereto the letter "R."

When the reactivation exhaust temperature has reached the desired point, for example, TX (Fig. 2), the bridge 133 will be in balance and the multi-vibrator 138 will be actuated to generate a bridge balance signal in a manner similar to that described above in connection with the adsorption side bridge 45 and the adsorption multi-vibrator 48.

The reactivation bridge balance signalling means governs the above-described relay 39 (which controls the reactivation hot air)

through the intermediary of an amplifier circuit 139 and said "on-off" switching circuit 108 above mentioned. The bridge balance signal from multi-vibrator 138 is amplified by an amplifier tube 140 of said amplifier circuit 139. Said multi-vibrator signal is directed to the amplifier tube 140 by means of a lead 141 having therein a suitable capacitor 142 and resistance 143 which are analogous to the above-described capacitor and resistance 113 and 114, respectively. The lead 141 is connected to the grid of the tube 140 and said grid in turn is connected to ground through a suitable grid resistance 144. The plate of the amplifier tube 140 is connected by means of a lead 145 to a suitable plate supply 52 R analogous to the above-mentioned plate supply 52. A common plate supply can be employed if desired. A plate resistor 146 is interposed in said lead 145. The cathode of the tube 140 is connected by means of a lead 147 to a point 109a of said lead 109 and thence to ground through the above-described lead 109 and resistance 106.

The above-mentioned "on-off" switching circuit 108 in general is constituted by a pair of thyratron tubes 148 and 149 which are interconnected in a manner somewhat similar to the sequence switching thyratrons 80 and 81 above described. The connections are similar in that the common plate supply 82a, for example, of plus 200 volts, is provided for said tubes 148, 149, the interconnection being accomplished through leads 151 and 152 which are connected to a plate supply lead 150a. Suitable plate resistors 153 and 153a are interposed in said leads 151 and 152, respectively, and the coil of the above-described reactivation fan relay 39 preferably is interposed in the lead 151 and hence is energized when the tube 148 is conducting.

The relay 39 is normally closed, that is, when the relay coil thereof is deenergized, the relay contacts as at 40 (Fig. 1) are closed and the reactivation fan 29 is in operation. However, when the relay coil 39 is energized, the contacts or switch 40 will be opened and the reactivation fan 29 will be thus arrested.

The cathodes of the thyratrons 148, 149 are respectively grounded by the above-mentioned lead 109 and a lead 154, the latter lead being connected at a point 154a with the above-described lead 110, and thence connected to the grounded lead 109 at point 109a.

The plates of tubes 148 and 149 are electrically associated by means of a lead 155 also having therein a commutating condenser 156 which serves a purpose analogous to the above-described commutating condenser 89 which is interposed between the plates of the sequence switching thyratrons 80, 81. Thus if one of the "on-off" switching circuit thyratrons 148, 149 is normally in a non-conducting condition, it can be fired by the other thyratron in a manner analogous to the sequence switching thyratrons. In order to insure that one of the thyratrons 148, 149 is initially non-conducting, a potential of, for example, minus 10 volts, is impressed upon the grid of, for example, tube 148. Such a source of potential is indicated as at 91a and is connected to the grid of the tube 148 by means of a lead 158, there being interposed in said lead a grid resistor 159.

Inasmuch as the thyratron 148 is selected as the one to be initially non-conducting, and the one in the plate circuit of which is interposed the reactivation relay 39, this tube (148) is placed under the influence of the amplifier tube 140. That is, the grid of the tube 148 by means of a lead 160 is connected to the plate of the amplifier 140, there being a suitable capacitor 161 in the lead 160.

If we now assume that the wet air exhaust temperature has reached the desired temperature (TX), the so-called cut-out point, a signal will be generated by the multi-vibrator 138 calling for a stopping of reactivation. A part of the voltage of this signal is amplified by the amplifier tube 140 and employed to fire the initially non-conducting thyratron 148. Notice that this signal is sent only to the one thyratron 148 and not to both thyratrons 148, 149 as is the case with the actuating impulse directed to the sequence switching circuit above described. The reason for this is that the next or ensuing "stop reactivation" signal must not be permitted to extinguish the thyratron 149 as would be the case if the amplifier 140 were connected to both of the tubes 148, 149 in a manner analogous to the association of the trigger tube 101 and the sequence switching thyratrons. The control of the thyratron 149 must remain, for a reason to appear hereinafter, partially in the adsorption side of the apparatus and more particular in the trigger tube 101. The thyratron 149 is initially conducting when the thyratron 148 is fired through the intermediary of the amplifier 140 in response to a stop reactivation signal which firing will extinguish tube 149. Moreover, the firing of the thyratron 148 will, of course, energize the relay 39 and hence will open its normally closed contacts 40 (Fig. 1) and arrest the reactivation fan 29.

Normally the "stop reactivation" signal will be generated somewhat in advance of the cycle change-over signal. Consequently, when the latter is produced, it should initiate the next reactivation cycle in addition to initiating the cycle change-over. The cycle change-over signal, namely, the bridge balance signal of the adsorption multi-vibrator 48, is effective to initiate reactivation through the intermediary of the above-described trigger tube 101 which, by means of a lead 162 having therein a capacitor 163, is in control of the grid of the thyratron 149, the grid of the latter tube being grounded in a conventional way through a grid resistor 164.

Thus normally or under most conditions, the sequence of operation of the reactivation and adsorption sides of the apparatus will not tend to be upset. However, there are certain examples of the operation wherein the time of the reactivation and the time of the adsorption cycle may be approximately equal and upon completion of the adsorption cycle the valves 22b and 23b are switched to their next position and a "start reactivation" signal is directed to the tube 149 from trigger tube 101 via lead 162 (interlock C). If, during the cycle change-over signal, there is a slight delay in the generation of the "stop reactivation" signal, the latter may be directed to the "on-off" switching circuit 108 via the amplifier circuit 139, after the occurrence of the "start reactivation" signal from the trigger tube 101, providing, of course, the adsorption and reactivation cycles are approximately of equal duration. If this occurs, one of the desiccant beds will ordinarily have its reactivation process arrested at the very outset and will remain wet, thereby preventing a proper adsorption cycle on the next switch of the valves 22b, 23b. Such a delay in the generation of the "stop reactivation" signal may be caused by a delay in the response of the thermistor RW.

Suitable means are provided for preventing such a delayed "stop reactivation" signal from arresting reactivation provided, of course, that it occurred or was at least partially co-extensive with the cycle change-over signal generated by the adsorption side of the apparatus.

Such novel means comprise the following:

(a) A primary bias increase applied to amplifier tube 140. When the thyratron 149 is conducting, the voltage drop across resistance 106 is just sufficient to provide a normal bias for the amplifier tube 140. However, the on-off circuit 108 is so designed that when the thyratron 148 is fired, an extra amount of current flows therethrough and returns to ground through resistance 106. This extra current through resistance 106 provides the primary bias increase for the amplifier tube 140 and increases its bias to the so-called "cut-off" point whereby the tube will no longer amplify. Thus the effect of a persistent "stop reactivation" signal is nullified with respect to the "on-off" switching circuit 108 and no more of this particular "stop reactivation" signal will reach the thyratron 148. Thus the possibility of upsetting the sequence of the circuit by an unduly persistent "stop reactivation" signal is prevented. This so-called primary bias increase for the thyratron 140 will, of course, persist only so long as the thyratron 148 conducts. When the latter is extinguished as by the firing of the thyratron 149 in response to a cycle change-over signal from the trigger tube 101, a so-called secondary bias increase will be applied to the amplifier 140 in a manner to appear below.

(b) A secondary bias increase for the amplifier tube 140. When the trigger tube 101 is fired it also fires the thyratron 149 of the "on-off" switching circuit. This firing of the thyratron 149 extinguishes the thyratron 148, thus terminating the above-described primary bias increase for the amplifier tube 140. Thereupon, a so-called secondary bias increase for the same amplifier tube arises, as a result of the operation of the trigger tube 101, through the intermediary of the above-described so-called interlock A or lead 107, whereby an additional potential is applied to the point 109a on the reactivation side which normally will so influence the bias of said amplifier tube that its amplification will be prevented entirely and thus the thyratron 148 will be maintained in a non-conducting condition. Also the reactivation fan relay 39 will be deenergized, whereby the reactivation fan will be maintained in operation.

The above-described bias increases for the amplifier tube 140 are effective only while thyratron 148 is conducting and thereafter while the trigger tube 101 is conducting. Thus in the absence of any further interconnection between the adsorption and reactivation sides of the control, these shields in the form of the shielding bias voltages would be effective only up to the expiration of the cycle change-over signal. However, there is a possibility that under some circumstances a "stop reactivation" signal may occur during a "cycle change-over" signal and persist after the expiration thereof in which case the reactivation would be arrested at an undesired time and upset the sequence of operations of the device.

Thus some means must be provided for continuing the effect of the shielding bias such as the secondary bias increase for the amplifier tube 140. The latter bias increase, of course, is the result of the operation of the trigger tube 101. Consequently, if some means can be provided for extending the operation of the trigger tube 101 as long as there is a "stop reactivation" signal then, of course, it would be impossible for the latter signal to fire the thyratron 148 and hence to stop the reactivation.

The novel interconnection for extending the operation of the said trigger tube is constituted by a so-called Interlock B or lead 165.

The lead 165 interconnects a point 141a of lead 141 with a grid of dual triode 123, that is, the output signal of the reactivation multi-vibrator 138 is directed to the mechanism which is designed for controlling the reset tube 118. Point 141a of lead 141 is preferably intermediate condenser 142 and resistance 143. It was explained above that the interlocking reset circuit is designed for extinguishing the trigger tube 101 after the expiration of the "cycle change-over" signal, and thus to prepare the trigger tube for the next output signal from the adsorption multi-vibrator 48. The Interlock B above mentioned is adapted for delaying the extinguishing of the trigger tube 101 by extending the length of time that the grid of the reset tube 118 controls same and maintains it in a non-conducting condition. If, for example, we assume that the "cycle change-over" and the "stop reactivation" signals commence precisely at the same instant and that the former endures for ten time units and the latter for twelve time units it will be evident that without the Interlock B (lead 165) the above-described secondary bias voltage will cease after ten time units and the stop reactivation signal will be effective to fire the thyratron 148 and thus to stop the reactivation which was begun as a result of the firing of tubes 101 and 149. However, by virtue of the feeding of the "stop reactivation" signal into the interlocking reset circuit, the extinguishing of the trigger tube 101 is delayed until the expiration of said twelfth unit of time and consequently the secondary bias increase voltage for the amplifier tube 140 is caused to persist until the expiration of said twelfth time unit. Thus the delayed and undesired stop reactivation signal is incapable of triggering the thyratron 148 and of stopping reactivation.

Of course, the "stop reactivation" signal voltage cannot have any effect upon the interlocking reset circuit or upon the reset tube 118 unless the grid of the latter tube is in control thereof. In other words, in order for the "stop reactivation" signal to be effective to delay the extinguishment of trigger tube 101 and hence to extend the existence of the above-described secondary bias voltage as long as a "stop reactivation" signal persists, it is necessary for said stop reactivation signal to be at least partially co-extensive with a corresponding "cycle change-over" signal. If the "stop reactivation" signal were directed to the interlocking reset circuit when the reset tube 118 is in its normally conducting condition, it will have no effect thereon.

In operation, let us assume for a first example thereof that the novel control is operating under relatively low moisture conditions, that is, under conditions wherein the adsorption cycle will be substantially longer than the reactivation cycle. Moreover, let us assume that the temperature R-in is zero degrees Fahrenheit. It will be observed from Fig. 6 that when R-in is zero degrees Fahrenheit a desired temperature differential for cycle change-over is 16° F. Throughout the adsorption cycle the temperature R-in will remain substantially constant. When $T_2 - T_1$ is equal to 16° F., the adsorption bridge 45 will be in balance and the rectifier 49 will be triggered, whereby the multi-vibrator 48 is actuated and an output or bridge balance signal is directed to the trigger tube 101. The normally non-conducting trigger tube 101 will be fired, thereby extinguishing the normally conducting reset tube 118. The bridge balance signal from the multi-vibrator 48 also is fed to the interlocking reset circuit, and by means of the dual triode 123, the rectifier tube 124 and related elements causes the grid of the reset tube 118 immediately to gain control thereof, which control persists at least for the duration of the bridge balance signal.

The firing of the trigger tube 101 has the following effects: (a) Switches the valves 22b, 23b by firing the sequence switching thyratron 80, the latter extinguishing the sequence thyratron 81 via the commutating condenser 89. The firing of the thyratron 80, of course, energizes the relay 37 and by means of the solenoid 35 changes the position of valve 33 of power cylinder 32 and hence shifts the above-mentioned cycle change-over valves 22b, 23b.

(b) Starts reactivation. This is accomplished by means of a simultaneous effect of the firing of trigger tube 101 upon the "on-off" switching circuit 108. The sudden change in potential of the point 107b not only changes the bias of the grid of thyratron 80 to the extent that it conducts whereas theretofore it was non-conducting, but it also triggers the "on-off" thyratron 149 which is normally non-conducting, extinguishes thyratron 148, thereby deenergizing the relay coil 39, closing the switch 40, and starting reactivation.

Sometime prior to the balancing of the adsorption bridge 45, the reactivation bridge 133 comes into balance by virtue of the wet air exhaust temperature reaching $T_x$. This has the effect of actuating the multi-vibrator 138, the output signal of which is directed to the amplifier 139 and thence to the "on-off" switching circuit, that is, to the thyratron 148, which is normally and initially non-conducting, thereby firing tube 148 and energizing relay 39, which in turn opens switch 40 and stops reactivation.

In the second example of the operation of the device, assume that the novel control is operating under substantially maximum moisture conditions under which circumstances the adsorption and reactivation cycles will be about equal in duration. Furthermore, assume that the adsorption side of the apparatus has operated in the manner above described and has generated a "start reactivation" signal which is directed from tube 101 to the reactivation side via the lead 162. If the reactivation cycle is still under way at the time that the "cycle change-over" signal is generated, it is, of course, desirable for the reactivation to continue after the valves 22b, 23b have been changed. Thus upon the cycle change-over, namely, the switching of the valves 22b, 23b, $R_w$ will suddenly be subject to the lowest temperature as indicated in Fig. 2 on the line $T_4$. However, it may be possible thereafter for the bridge to move into balance and to generate a delayed bridge balancing signal which, without the novel interconnection between the reactivation and adsorption side of the apparatus, would arrest the reactivation of a wet desiccant bed. It was mentioned above that the cycle change-over signal will persist for from 3 to 5 seconds during which time the above-mentioned trigger tube 101 will, by virtue of its conduction, apply the above-described secondary bias increase or shielding bias to the amplifier tube 140. If the "stop reactivation" signal is delayed in starting but commences during the "cycle change-over" signal and persists thereafter, said secondary bias voltage will also persist until the expiration of the "stop reactivation" signal. This is accomplished by applying the stop reactivation impulse to the above-mentioned interlocking reset circuit by the Interlock B (lead 165). Thus the period of operation or conduction of the trigger tube 101 is extended until the expiration of the "stop reactivation" signal and said shielding bias is co-extensively prolonged whereby the undesired reactivation signal is incapable of stopping reactivation. Thus reactivation is allowed to continue but in view of the cycle change-over upon a different desiccant bed.

While the invention has been described with respect to certain preferred examples which have given satisfactory results, it will be understood by those skilled in the art after understanding the invention that various changes and modifications may be made without departing from the spirit and scope of the invention, and it is intended therefore in the appended claims to cover all such changes and modifications.

In this specification and the following claims the terms "vacuum tube" and "electron tube" both refer broadly to high vacuum devices functioning by electron emission control, and the term "thermionic valve" or the like expression is intended as a generic expression to comprehend the said devices and those of similar character, whether using a hot cathode or a cold emitter. These terms also include the associated circuits necessary for the operation of the tubes.

What is claimed as new and is desired to be secured by Letters Patent is:

1. In apparatus of the class described, the combination comprising: an electronic multi-vibrator including a pair of electronic tubes each having a control grid and an anode, a connection between the control grid of each tube to the anode of the other tube, one such connection including a conjugate arm of a balancing bridge in shunt with a diode having its anode coupled to the control grid of one of said tubes, and its cathode directly connected to such bridge, said bridge including a pair of fixed ratio balancing arms and a pair of balancing arms containing temperature sensitive elements; an opposite conjugate arm of said bridge an said diode being adapted for use with a direct current source of electrical energy for energizing same; said bridge responding to a balanced condition of said temperature sensitive elements to energize said diode and thereby to energize said multi-vibrator; and a control device responsive to energization of said multi-vibrator for influencing the temperature conditions of said temperature sensitive elements.

2. In a control device of the class described, a normally inactive multi-vibrator; means for activating the latter including a conjugate arm of a balancing bridge in shunt with a rectifier connected in feedback relation with said multi-vibrator, said bridge and rectifier being electrically coupled to said multi-vibrator, said bridge having as two balancing arms thereof temperature sensitive devices; means responsive to a balanced condition of said bridge thereby to energize said rectifier; and a control device responsive to energization of said multi-vibrator for influencing the temperature condition of said temperature sensitive devices.

3. In apparatus of the class described, a pair of desiccant beds; mechanism for selectively directing intake air to either one of said beds for an adsorption cycle; mechanism for selectively directing heated air to either one of said beds for a reactivation cycle; temperature responsive resistance elements for sensing the temperature of the air at the inlet and outlet of each of said beds, said elements being adapted for measuring the temperature differential between the inlet and outlet air temperatures of the bed which is undergoing an adsorption cycle, and for measuring the exhaust temperature of the bed undergoing a reactivation cycle, said elements also being subject to a preselected change in resistance in response to predetermined temperature changes whereby for preselected temperature differentials therebetween the resistances thereof are equal; means responsive to said elements reaching equal values of resistance when a bed is undergoing adsorption for terminating the flow of adsorption air thereto and initiating a flow of reactivation air thereto; and means for terminating a flow of reactivation air to a bed undergoing reactivation in response to an outlet temperature resistance element reaching a preselected resistance value.

4. In apparatus of the class described, a desiccant bed; adsorption cycle mechanism for directing a gas through said bed for adsorbing moisture therefrom during an adsorption cycle; reactivation cycle mechanism for directing a heated gas through said bed for reactivating same during a reactivation cycle; an inlet thermal resistance element for sensing the temperature of the influent gas to said bed, the resistance of said element being variable between predetermined limits in response to temperature change also between predetermined limits; an outlet thermal resistance element for sensing the temperature of the effluent gas from said bed, the resistance of said outlet element also being variable between the same predetermined limits in response to a change of temperature between preselected limits whereby the resistances of said elements are of equal value over a predetermined range of temperature differentials therebetween; balance sensing means for sensing a balance between the resistances of said elements; means operatively connected to said balance sensing means for rendering inoperative said adsorption cycle mechanism and for initiating said reactivation cycle mechanism; a temperature responsive element for sensing the temperature of the effluent gas during reactivation, and mechanism operative in response to said last-named element sensing a predetermined temperature for rendering inoperative said reactivation cycle mechanism and initiating the operation of said adsorption cycle mechanism.

5. In a control mechanism the combination including, a heat responsive resistance element adapted for changing resistance within predetermined limits in response to temperature change between preselected limits; another heat responsive resistance element also adapted for changing resistance within the same limits as the first-mentioned element in response to temperature change between limits which are different from those of said first-mentioned element whereby the resistances of said elements can be equal but a variable temperature differential exists therebetween in response to joint resistance changes while the resistances remain equal; and means responsive to said resistances becoming equal for initiating an electric impulse.

6. In a control of the class described the combination including a pair of resistances response respectively to the heat of fluid at two different locations, said resistances being equal over a preselected range of temperature differentials therebetween; means for responding to a balance of said resistances; and mechanism controlled by said last-named means for governing the movement of said fluid.

7. In a control device for an apparatus wherein influent and effluent fluids flow relative thereto, the combination including, a pair of resistances responsive respectively to the temperature of the influent and effluent fluids, said resistances being equal over a preselected range of temperature differentials therebetween, the temperature differential being a function of the temperature of the influent fluid; means for creating an impulse in response to said resistances coming into balance; and means for governing the flow of the fluid in response to an impulse from said last-named means.

8. In a control device for an apparatus wherein influent and effluent gases flow therethrough, mechanism for forcing gases through the apparatus; a pair of resistances responsive respectively to the temperature of the influent and effluent gases, said resistances being equal over a preselected range of temperature differentials between the resistances whereby the temperature of the influent gases can be substantially constant for the duration of one cycle of operation of the control device and the resistances will become equal at a predetermined temperature differential for that cycle, and the influent gas temperature can again be substantially constant but different from that first mentioned for another cycle of operation, the resistances becoming equal at another and different predetermined temperature differential; means for creating an impulse in response to said resistances coming into balance; and means for controlling the flow of gases through the apparatus in response to an impulse from said last-named means.

9. In apparatus for governing a control device the combination including: a bridge circuit having therein a pair of resistances having negative temperature coefficients and being subject respectively to fluid at different temperatures, said resistances being equal over a preselected range of temperature differentials therebetween; a bridge null detector circuit, which is normally quiescent but is adapted for transmitting an impulse in response to said resistances coming into balance; an oscillator circuit connected into and actuatable by said bridge null detector circuit in response to an impulse therein; and means responsive to an output impulse of said oscillator circuit for actuating the control device.

10. In apparatus of the class described for governing a control element: a pair of resistances responsive respectively to a first and second range of changing temperatures, said resistances varying in preselected manners over said ranges whereby the resistances thereof are equal over a preselected range of temperature differentials therebetween; a normally inactive thermionic valve electrically connected to said resistances and rendered operative in response to said resistances coming into balance, said valve being rendered inoperative a preselected time after said resistances become balanced; an oscillator circuit controlled by said thermionic valve; and means responsive to successive output impulses of said oscillator circuit for alternately energizing and deenergizing the control element.

11. In apparatus for use in combination with a pair of desiccant beds having a valve mechanism for directing intake air from an intake pump selectively to either one of the desiccant beds for an adsorption cycle and for simultaneously directing heated air from a hot air pump to the other bed for a reactivation cycle, the combination comprising: a valve mechanism control device for switching the position of said valve mechanism whereby the cycles to which said beds are subjected are switched; a control element for the hot air pump; a normally inactive electronic multi-vibrator including a pair of electronic tubes each having a control grid and an anode, a connection between the control grid of each tube to the anode of the other tube, one such connection including a conjugate arm of a balancing bridge in shunt with a diode having its anode coupled to the control grid of one of said tubes, said bridge including a pair of fixed ratio balancing arms and a pair of balancing arms containing temperature sensitive elements, the latter pair of elements being respectively associated with the desiccant beds for sensing respectively the inlet and outlet air temperatures of the bed undergoing an adsorption cycle, an opposite conjugate arm of said bridge and said diode being energized by direct current; said bridge responding to a balanced condition of said temperature sensitive elements to energize said diode and thereby to energize said multi-vibrator whereby there is produced a multi-vibrator signal of preselected duration; a sequence switching circuit including a pair of thyratron tubes electrically associated with one another through a commutating condenser, said valve mechanism control device being electrically associated with one of said sequence switching circuit thyratron tubes for switching the valve mechanism in response to energization of such thyratron; a trigger circuit including a normally non-conducting trigger thyratron tube electrically associated with said multi-vibrator and said sequence switching circuit for actuating the latter in response to a signal from said multi-vibrator; a reset circuit for said trigger tube including a normally conducting reset thyratron tube associated with said trigger tube through the intermediary of a commutating condenser whereby the reset tube is extinguishable in response to the firing of said trigger tube and vice versa, said reset circuit also including electronic means for controlling said reset tube to prevent the firing thereof for the duration of a signal emanating from said multi-vibrator, a second multi-vibrator analogous to that above set forth, one of the connections thereof between a control grid of one tube and the anode of the other tube thereof also including a conjugate arm of a balancing bridge in shunt with a diode, said bridge including three fixed ratio balancing arms and a balancing arm containing a temperature sensitive element, the latter element being positioned for sensing the outlet air temperature of the bed undergoing a reactivation cycle; an amplifier for receiving and amplifying the signal of said second multi-vibrator; an on-off switching circuit including a pair of thyratron tubes being interconnected through a commutating condenser and having associated therewith said control element for the hot air pump, one of said on-off switching circuit thyratron tubes being normally non-conducting and adapted for extinguishing the other on-off switching circuit thyratron in response to a signal from said amplifier, said hot air pump control element being operatively associated with said last-mentioned normally non-conducting thyratron; an electrical interconnection between said trigger circuit and said on-off switching circuit for actuating said hot air pump control element to start a reactivation cycle in response to energization of said trigger tube; a second electrical interconnection between said trigger circuit and said on-off switching circuit and said amplifier for increasing the bias of said amplifier to the cut-off point during the energization of said trigger tube; and an electrical interconnection between said second multi-vibrator and said reset tube for maintaining the latter in a non-conducting condition in response to the reception thereby of a signal from said second multi-vibrator which is at least partially co-extensive with a signal from said first-mentioned multi-vibrator.

12. In a control device of the class described a normally inactive multi-vibrator including a first control grid and anode and a second control grid and anode, a connection between the first control grid and the second anode and a connection between the second control grid and the first anode, one such connection including a conjugate arm of a balancing bridge in shunt with a rectifier electrically associated with said multi-vibrator for providing feedback oscillations in the multi-vibrator, said bridge including a pair of fixed ratio balancing arms and a pair of balancing arms containing temperature sensitive elements, an opposite conjugate arm of said bridge and said rectifier being energizable by a source of electrical energy, said bridge responding to a balanced condition of said temperature sensitive elements to energize said rectifier and thereby to energize said multi-vibrator, the latter being normally quiescent; a control device responsive to energization of said multi-vibrator for influencing the temperature conditions of said temperature sensitive elements; said multi-vibrator generating a signal of predeterminable duration; a third temperature sensitive element; a control element responsive to said third temperature sensitive element reaching a preselected temperature for actuating said control element and influencing the temperature conditions of said third temperature sensitive element; an operative interconnection between said multi-vibrator and said control element for actuating the latter in response to a signal from said multi-vibrator; and an operative interconnection between said third temperature sensitive element and said control device for preventing actuation of said control element in response to said third temperature sensitive element reaching a preselected temperature during the generation of a signal by said multi-vibrator.

13. In apparatus for use with a pair of desiccant beds having a valve mechanism for directing intake gas from an intake pump selectively to either one of the beds for an adsorption cycle and for simultaneously directing heated gas from a second pump to the other bed for a reactivation cycle, the combination including: a valve mechanism control device for switching said valve mechanism whereby the pumps with which said beds are in communication are also switched; a control element for the second gas pump; a normally inactive electronic multi-vibrator including a first control grid and anode and a second control grid and anode, a connection between the first control grid and the second anode and a connection between the second control grid and the first anode, one such connection including a conjugate arm of a balancing bridge in shunt with a diode having its anode coupled to the control grid of one of said tubes, said bridge having as two balancing arms thereof temperature sensitive elements; said bridge being energizable by a source of electrical energy; said diode and multi-vibrator being normally quiescent and energized in response to a balanced condition of said bridge; a control circuit electrically connected to said multi-vibrator for actuating said valve mechanism control device in response to each signal from said multi-vibrator; a third temperature sensitive element positioned for sensing the temperature of the gas issuing from the desiccant bed undergoing reactivation; a second control circuit operatively interconnecting said third temperature sensitive element with said control element for said second pump whereby the latter is arrested in response to such temperature sensitive element reaching a preselected temperature; an operative interconnection between said first control circuit and said second control circuit for actuating said second pump in response to a signal from said multi-vibrator; and a second operative interconnection between said second control circuit and said first control circuit for rendering the former inoperative with respect to said control element in response to said third temperature sensitive element reaching a preselected temperature during the period of a signal from said multi-vibrator.

14. In apparatus for use with a pair of desiccant beds having a valve mechanism for directing intake air from an intake pump to either one of the desiccant beds for an adsorption cycle in such bed and for simultaneously directing a reactivation gas from a reactivation pump to the other bed for a reactivation cycle, the combination including: a valve mechanism control device for switching the valve mechanism and thereby switching the pumps with which said beds are in communication; a control element for the reactivation pump; a pair of temperature sensitive resistances positioned respectively for sensing the temperature of the intake and outlet air of the desiccant bed undergoing an adsorption cycle, said resistances being electrically equal over a preselected range of temperature differentials therebetween; electronic means for generating a cycle change-over signal of predeterminable duration in response to said resistances coming into balance; said valve mechanism control device being operatively associated with said cycle change-over generating means for switching said valve mechanism in response to a cycle change-over signal; a reactivation exhaust temperature sensing element positioned for sensing the temperature of the exhaust from the desiccant bed undergoing a reactivation cycle; means for generating a stop reactivation signal in response to a preselected reactivation exhaust temperature as sensed by said last-named element; said reactivation pump control element being operatively connected to said stop reactivation signal generating means; a first operative interconnection between said cycle change-over signal generating means and said reactivation pump control element for actuating said reactivation pump; and a second operative interconnection between said stop reactivation signal generating means and said cycle change-over signal generating means for rendering ineffective a stop reactivation signal which is at least partially coextensive with a cycle change-over signal.

WYAN LOU.

REFERENCES CITED

The following references are of record in the file of this patent:

UNITED STATES PATENTS

| Number | Name | Date |
|---|---|---|
| 2,257,478 | Newton | Sept. 30, 1941 |
| 2,275,452 | Meacham | Mar. 10, 1942 |
| 2,328,974 | Guler | Sept. 7, 1943 |
| 2,366,076 | Wilbur | Dec. 26, 1944 |

OTHER REFERENCES

Radio News, August 1946, pages 15–17, 20 and 23 of Engineering Dept.